United States Patent [19]

Foust

[11] Patent Number: 5,226,545
[45] Date of Patent: Jul. 13, 1993

[54] EXTRACTION OF MERCURY AND MERCURY COMPOUNDS FROM CONTAMINATED MATERIAL AND SOLUTIONS

[75] Inventor: Donald F. Foust, Scotia, N.Y.

[73] Assignee: General Electric Company, Schenectady, N.Y.

[21] Appl. No.: 963,225

[22] Filed: Oct. 19, 1992

[51] Int. Cl.$^5$ .............................................. B03B 1/00
[52] U.S. Cl. .......................................... 209/3; 209/12
[58] Field of Search ......................... 209/3, 12, 15, 16

[56] References Cited

U.S. PATENT DOCUMENTS

| | | | |
|---|---|---|---|
| 4,435,284 | 3/1984 | Heytmeijer | 209/3 |
| 4,557,759 | 12/1985 | McGrew et al. | 75/118 R |
| 4,734,171 | 12/1985 | Murphy | 204/111 |
| 4,857,174 | 8/1989 | Moudgil et al. | 209/3 |
| 4,859,293 | 8/1989 | Hirako et al. | 204/94 |
| 5,032,175 | 7/1991 | Raborar et al. | 209/3 X |

OTHER PUBLICATIONS

C. Nunez & F. Espiell, "New Hydrometallurgical Process for Obtaining Mercury from Cinnabar Ore", Metallurgical Transactions B, vol. 15B, Jun. 1984, pp. 229-233.

Primary Examiner—D. Glenn Dayoan
Attorney, Agent, or Firm—James Magee, Jr.

[57] ABSTRACT

Mercury and mercury-containing compounds can be removed from soil, sand, and similar materials by a remediation method in which the contaminated material is treated with an aqueous composition comprising an oxidant, such as iodine, and a complexing or solubilizing agent, such as potassium iodide, the liquid and solid phases are separated, and further processed as needed.

5 Claims, 1 Drawing Sheet

EXTRACTION OF MERCURY AND MERCURY COMPOUNDS FROM CONTAMINATED MATERIAL AND SOLUTIONS

This invention is directed to the remediation of mercury-contaminated materials and compositions such as land fill materials, industrial wastes, toxic or hazardous wastes, ground waters soil, sand, gravel, building materials, and the like. More particularly, the invention is directed to the recovery of mercury from solid materials and aqueous solutions by chemical extraction which may be followed by subsequent regeneration of elemental mercury and the extractant.

Mercury is a serious environmental contaminant. Its toxicity is intensified because it forms compounds some of which have been found to concentrate and remain in fatty tissue. Mercury can persist in a number of chemical forms including inorganic salts, organometallic compounds, and as elemental mercury. The solubility of mercury compounds in both aqueous and organic solvents varies from extremely soluble to extremely insoluble. Mercury-containing species can be either anionic or cationic. It has been found to enter the environment by a number of pathways including leaching from mercury-containing alloys, evaporation of volatile materials, application of various pesticides, and improper disposal of industrial wastes.

When in soil or other particulate material mercury and its derivatives are bound quite tightly, frequently to the organic portion. Such compounds slowly leach into ground waters thereby spreading the contamination to the water supply.

Various techniques for the removal of toxic metals such as cadmium, chromium, copper, nickel, lead, and zinc from soils have been developed. Generally, such methods involve mobilization of the contaminant by washing with an aqueous composition containing additives which increase the solubility of metal or metal-containing compound thus making in-situ and ex-situ flushing procedures possible. Generally, water alone is not an effective method for removal of mercury.

Similar techniques have been employed for the extraction of metals from their ores. Once in the aqueous phase methods are available for isolating and recovering the metal, including ion exchange techniques and carbon adsorption.

It is known that chloride containing salts, synthetic and natural chelating agents, and certain oxidants increase the mobility of mercury in soil. However, mobility of a contaminant imposes a high level of extraction efficiency on a process in order to constitute an effective remediation technique.

SUMMARY OF THE INVENTION

Figure 1:
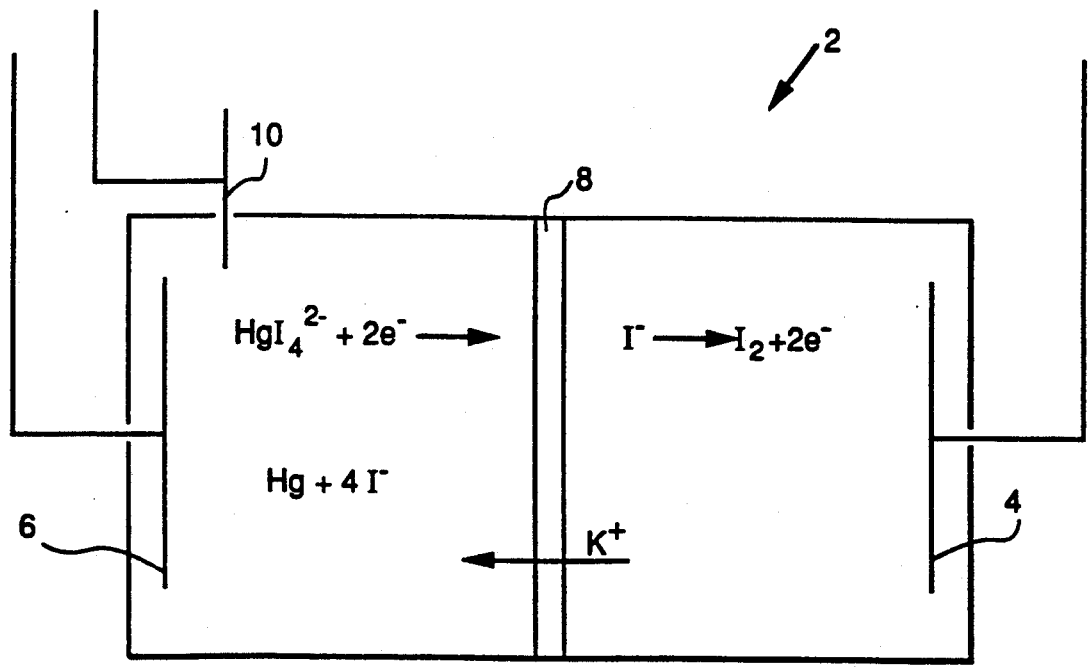
FIG. 1 is a schematic representation of an electrochemical cell for recovery of elemental mercury and regeneration of the oxidant-complexing agent solution.

This invention provides a process for removing mercury-containing contaminants from solid materials such as sand, soil, pulverized industrial wastes, or selected components of industrial waste such as phosphors which have been separated from lamp tubes. The process includes treating the mercury contaminated solid material with a liquid oxidant-complexing agent composition which oxidizes the mercury to a form which can be solubilized by the complexing agent. The mercury-containing liquid phase is then separated from the solid material and, if desired, further treated to regenerate the oxidant-complexing agent composition and convert soluble mercury to recoverable elemental mercury. The regenerated reactant composition can be reused for subsequent washing operations on the same or other mercury-contaminated materials.

The major object of the invention is to provide an efficient process for extracting mercury-containing contaminants in a variety of chemical forms from solid materials. Another object of the invention is to recover the extracted mercury in the form of elemental mercury which can be utilized and handled in accordance with established procedures and techniques. Another object is to provide a remediation process in which the remediation reagent can be regenerated for further use.

DESCRIPTION OF THE INVENTION

The nature and condition of soils and solid waste materials which may be contaminated by elemental mercury or various mercury compounds, including organomercury compounds, is virtually unlimited. Any method for decontamination must be suitable with only minor modifications, for use on solid materials ranging from fine sand and soil through gravels to irregular shaped chopped up metal and plastic parts such as the phenolic resin components of lamps, light switches and the like.

The process of this invention enables one to remove mercury from mercury contaminated solid materials which comprises treating the contaminated materials with an aqueous extractant-composition comprising an oxidizing agent in an amount sufficient to oxidize elemental mercury to the mercuric oxidation state and a complexing agent in an amount sufficient to form a water-soluble complex with mercuric compounds and separating the aqueous extractant composition from the solid materials.

Another embodiment of the invention is a process for removing elemental mercury and chemically combined mercury from mercury-contaminated solid material which comprises contacting the mercury-containing solid material with an aqueous extractant composition containing from about 0.1 to about 1 mole of potassium iodide and from about 0.0001 to about 0.5 mole of iodine per liter for a period of time sufficient to solubilize substantially all of the mercury contaminant, separating the solid material from the mercury-containing extractant, and electrochemically removing the mercury from the aqueous extractant to regenerate a mercury-free aqueous extractant composition.

Since the process of the invention involves transfer of the mercury contaminant to a liquid phase, it is essential that the contaminated solid material be in a form suitable for washing. The liquid phase containing the decontamination reactants, preferably in aqueous solution, are passed or percolated through the particulate solid material, thereby contacting the contaminant, which is generally in solid form, with the reactants.

Table I below, sets forth illustrated mercury contaminants which can be removed from mercury-contaminated soil by the instant process. Also shown are representative values for removal efficiency, mercury levels, and the amount of mercury removable by plain water washing.

TABLE I

| Contaminant | Oxidation State of Mercury | Average Hg Level (ppm) | % Mercury Removed by Extractant 1 ± 10 | % Mercury Removed by Water |
|---|---|---|---|---|
| Hg | 0 | 1000 | 113 | <3 |
| $Hg_2O$ | +1 | 984 | 92 | <3 |
| $Hg_2Cl_2$ | +1 | 1099 | 85 | <3 |
| HgO | +2 | 945 | 104 | <3 |
| HgS | +2 | 1007 | 101 | <3 |
| $Hg_3(PO_4)_2$ | +2 | 1102 | 93 | <3 |
| $Hg(NO_3)_2.H_2O$ | +2 | 819 | 110 | <2 |
| $HgCl_2$ | +2 | 939 | 106 | <7 |
| $CH_3HgCl$ | +2 | 910 | 77 | 26 |

1 Extraction with 0.1M KI/0.01M $I_2$ (10/1 Liquid/Solid Ratio) for 24 hr. at 22° C.

The active ingredients of aqueous liquid extractant composition comprise an oxidizing agent such as iodine which is capable of oxidizing the various species of mercury, including elemental mercury, to mercuric iodide ($HgI_2$). The composition also contains a complexing agent or solubilizing agent which reacts with the mercuric iodide to form a water soluble compound such as a salt. A preferred complexing is potassium iodide (KI) which combines with mercuric iodide to form a water soluble compound having the formula $K_2HgI_4$.

Preferred oxidizing agents are those which are characterized as being mild and which do not react with any of the varied components of the solid material to form oxidation products which complicate separation or exerabrate contamination of the solid material. With this criteria in mind, iodine is a most preferred oxidant. However, depending on the nature of the solid material and the chemical constitutes of the components thereof, other oxidants capable of oxidizing mercury to the +2 state are useful.

While potassium iodide is preferred, for the practice of this invention, other iodides such as lithium-, sodium-, calcium-, and ammonium-iodide are suitable for use as complexing agents. Table 2, below, shows representative data for extraction of elemental mercury and mercuric oxide from soil.

TABLE 2

| | | % Mercury Extracted | |
|---|---|---|---|
| Cation | Halide | Hg-Contaminated | HgO-Contaminated |
| Li | I | 51 | 97 |
| Na | I | 50 | 93 |
| K | I | 50 | 94 |
| $NH_4$ | I | 59 | 97 |
| Ca | I | 48 | 90 |

The removal of mercury from contaminated materials by the process of this invention involves the formation of the highly soluble species $HgI_4^{-2}$. For the system $KI/I_2$, the iodide provides a source of iodide ions and iodine serves as an oxidizing agent to oxidize elemental mercury. Since the oxidation-reduction reactions are reversible, the reagents can be electrochemically regenerated.

In carrying out the process of the invention the aqueous oxidant-complexing agent composition is prepared by dissolving the reactants in water in amounts sufficient to accomplish the respective functions. For example, iodine is soluble in potassium iodide. Accordingly, iodine is soluble a potassium iodide solution in an amount sufficient to oxidize the Hg. contaminant to $Hg^{+2}$. The concentration of potassium iodide must be sufficient to solubilize the iodine and complex all $Hg^{+2}$ in the system.

In the case of potassium iodide-iodine compositions, iodine is generally employed in amounts of at least about twice the stoichiometric amount, based on the amount of mercury in the contaminated material. Higher concentrations can be used. In general, iodine concentrations of about one half molar in one molar potassium iodide have been found to be effective for extracting mercury from a wide range of contaminated materials.

The effect of reactant concentrations on removal of mercury and mercuric oxide is illustrated in Table 3 below.

TABLE 3

Effect of KI and $I_2$ Concentrations on the Removal of Mercury from Soil

| | | % Mercury Extracted (±10%) | |
|---|---|---|---|
| [KI](M) | [$I_2$](M) | Hg-Contaminated | HgO-Contaminated |
| 0.45 | 0.01 | 103 | 103 |
| 0.3 | 0.1 | 106 | 97 |
| 0.1 | 0.01 | 106 | 105 |
| 0.1 | 0.001 | 97 | 101 |
| 0.1 | 0.0001 | 42 | 94 |
| 0.1 | 0 | 38 | 86 |
| 0.09 | 0.01 | 110 | 100 |
| 0.05 | 0.01 | 99 | 103 |
| 0.05 | 0.001 | 101 | 105 |
| 0.005 | 0.001 | 105 | 101 |

In general, iodine concentrations of from about 0.001 to about 0.5 moles per liter and potassium iodide concentrations of from about 0.1 to about 1 mole per liter are effective. In practice, the concentration of oxidizing agent and complexing can be optimized based on the amounts of mercury and mercury compounds carried by the material to be treated.

The extraction of mercury or oxidizable mercury compounds can be enhanced by either increasing the concentration of iodine or be increasing the volume of extractant composition.

Temperature has been found to have an effect on extraction efficiency. Higher temperatures favor removal of mercury. However, iodine is lost at temperatures above about 65° C. In general, operating temperatures between about 20° C. to 65° C. are preferred.

FIG. 1 illustrates an electrochemical regeneration cell 2 comprising an anode 4, a cathode 6 separated by a cation exchange membrane 8. The cell is provided with a reference electrode 10 which controls the potential between electrodes 4 and 6 and prevents electrolysis of water at cathode 6.

Placement of two platinized titanium electrodes anode 2 and cathode 4 in a 0.1M KI solution containing 1000 ppm Hg and application of 0.1 amp and 3.0 volt resulted in deposition of mercury at the cathode and production of iodine at the anode. Cation exchange membrane 8 and reference electrode 10 were not present. Examination of data from these reactions, set forth in Table 4 below reveals that mercury removal from solution is less than 100% efficient based on the number of electrons consumed. Iodine generation was also less than 100%. The pH of the solution increased from 7.3 to 10.8.

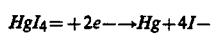

$HgI_4 = +2e^- \rightarrow Hg + 4I^-$

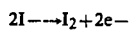

$2I^- \rightarrow I_2 + 2e^-$

Several other reactions were occurring at the cathode other than the reduction of mercury. These include the electrolysis of water and the reduction of iodine. Such reactions would result in a lower than expected concentration of iodine and an increase in pH. A total of 2.98 mole electrons were consumed at the cathode. The reduction of mercury accounted for 33% of the electrons, the reduction of iodine accounted for 53% and the reduction of water accounted for 2%.

$$2H_2O + 2e^- \rightarrow H_2 + OH^-$$

$$I_2 + 2e^- \rightarrow 2I^-$$

In order to control the reduction of iodine at the cathode, the electrodes were physically separated with a cation exchange membrane 6. A solution of 0.1M KI containing 1000 ppm Hg was the electrolyte for the cathode and a 0.1M KI solution was the electrolyte for the anode. At the anode, the iodine produced forms $I_3^-$ in the presence of iodide. It will therefore not pass through membrane 6 to any great extent. This will prevent the reduction of iodine at the cathode. Since the mercury is in the form of tetraiodomercurate, it will stay at the cathode and be reduced.

As shown in Table 4, below, application of 44 coulombs at 0.0 volt potential versus the cathode reduced the mercury level to 9 ppm in the cathode with less than 4.5 ppm mercury migrating into the anode compartment. Iodine was found only in the anode compartment. A pH rise from 6.5 to 11.4 was observed in the catholyte. The reduction of mercury accounted of 87% of the coulombs with the remainder going to the electrolysis of water. A reference electrode 10 of Ag/AgCl was used to control the potential. The cathode not shown was stainless steel mesh and the anode not shown was platinum.

Current flow was then measured as function of the applied potential versus the cathode in the apparatus described above with deaerated 0.1M KI serving as the electrolyte in both compartments. Current flow would be indicative of electrolysis of water at the cathode. The results in Table 4 show that no current was observed below −0.3 V applied potential.

A potential of −0.25 V versus the cathode was then applied to the set-up shown in FIG. 1. Mercury levels in the cathode compartment were lowered from 1000 ppm to 21 ppm with a pH increase from 6.5 to only 8.3. The iodine produced in the anode compartment was at a level consistent with the amount of current applied.

TABLE 4

| Coulombs | Hg in Solution (ppm) | pH | [I₂](M) |
| --- | --- | --- | --- |
| 0 | 1000 | 7.3 | 0 |
| 96 | 576 | — | — |
| 192 | 17 | — | — |

TABLE 4-continued

| Coulombs | Hg in Solution (ppm) | pH | [I₂](M) |
| --- | --- | --- | --- |
| 288 | 12 | 10.8 | 0.0071 |

TABLE 5

| Applied Potential (V) | Current (mA) |
| --- | --- |
| 0 | 0 |
| −0.1 | 0 |
| −0.2 | 0 |
| −0.3 | 0.05 |
| −0.4 | 0.13 |
| −0.5 | 0.31 |
| −0.6 | 0.7 |
| −0.7 | 1.1 |
| −0.75 | 1.4 |
| −0.8 | 1.6 |
| −0.9 | 2.2 |
| −0.95 | 2.5 |
| −1.0 | 2.5 |
| −1.1 | 4.0 |
| −1.15 | 7.0 |
| −1.2 | 13 |
| −1.25 | 26 |
| −1.3 | 54 |
| −1.35 | 100 |

What is claimed is:

1. A process for removing mercury from mercury contaminated solid materials which comprises treating the contaminated materials with an aqueous extractant-composition comprising an oxidizing agent in an amount sufficient to oxidize elemental mercury to the mercuric oxidation state and a complexing agent in an amount sufficient to form a water-soluble complex with mercuric compounds and separating the aqueous extractant composition from the solid materials.

2. The process of claim 1 in which the oxidizing agent is iodine and the complexing agent is a water soluble halide having the formula RX or RX₂ wherein R is selected from the group consisting of potassium, lithium, sodium, calcium, and ammonium and X is iodide or chloride.

3. The process according to claim 1 in which the extractant composition contains from about 0.005 to about 1 mole per liter of potassium iodide and from about 0.0001 to about 0.5 moles of iodine per liter.

4. The process of claim 1 in which the extractant composition contains about 1 mole of potassium iodide and about one-half mole of iodine per liter.

5. A process according to claim 1 for removing elemental mercury and chemically combined mercury from mercury-contaminated solid material which comprises contacting the mercury-containing solid material with an aqueous extractant composition containing from about 0.1 to about 1 mole of potassium iodide and from about 0.0001 to about 0.5 mole of iodine per liter for a period of time sufficient to solubilize substantially all of the mercury contaminant, separating the solid material from the mercury-containing extractant, and electrochemically removing the mercury from the aqueous extractant to regenerate a mercury-free aqueous extractant composition.

* * * * *